July 5, 1960  A. N. GRAY  2,943,351
METHODS OF AND APPARATUS FOR EXTRUDING PLASTIC MATERIALS
Filed May 8, 1956  2 Sheets-Sheet 1

INVENTOR.
A. N. GRAY
BY
ATTORNEY

July 5, 1960 A. N. GRAY 2,943,351
METHODS OF AND APPARATUS FOR EXTRUDING PLASTIC MATERIALS
Filed May 8, 1956 2 Sheets-Sheet 2

INVENTOR.
A. N. GRAY
BY
ATTORNEY

United States Patent Office 2,943,351
Patented July 5, 1960

2,943,351
METHODS OF AND APPARATUS FOR
EXTRUDING PLASTIC MATERIALS

Alvin N. Gray, Edgewood, Md., assignor to Western Electric Company, Incorporated, New York, N.Y., a corporation of New York Filed May 8, 1956, Ser. No. 583,467

5 Claims. (Cl. 18—13)

This invention relates to methods of and apparatus for extruding plastic material, and particularly to methods of and apparatus for extruding organic plastic insulating and jacketing material upon continuously advancing filamentary conductors.

In producing an extruded covering on a filamentary conductor, serious difficulties have been encountered in the past in maintaining the covering concentric with respect to the conductor. One of the principal causes of eccentricity is the presence of unbalanced flow conditions within the extrusion head employed to form the covering on the conductor. This problem of unbalanced flow conditions is inherent in a conventional extruder of the cross head type.

The extrusion head of a conventional extruder of the cross head type generally is provided with an extrusion passage that communicates with and extends transversely across the exit end of the extrusion cylinder in which a stock screw is positioned for forcing an extrudable plastic material into the extrusion passage. Uuusually, a core guide is located at one end of the transversely extending extrusion passage and the conductor to be insulated is advanced through a guide pasage in the core guide into the extrusion passage at a point closely adjacent to the extrusion die positioned at the exit end of the extrusion passage. The core guide functions to confine the conductor so that it tends to pass through the axial center of the extrusion orifice in the extrusion die.

Due to the unavoidable 90° bend, the length of the path traversed by the plastic material flowing through that portion of the cross section of the extrusion passage nearest to the stock screw is substantially shorter than that traversed by the material flowing through the portion diametrically opposite thereto. In addition, in some extruders of this type, the flow of the plastic material through the portion of the cross section of the extrusion passage nearest to the stock screw approximates that of a fluid flow bounded by a single plate whereas in the diametrically opposite portion of the cross section, the flow approximates that of a fluid flow bounded by two parallel plates. Thus, the friction losses in the portion of the extrusion passage nearest to the stock screw are appreciably lower than elsewhere in the same cross section.

As a result of the differences in the lengths of the paths traversed by the plastic material in various portions of the extrusion passage and the physical environment of their associate flows, there exist substantial differences in the consistency and rate of flow throughout a cross section of the plastic material entering the extrusion orifice. The portion of the cross section nearest to the stock screw has the highest rate of flow and the more remote portion which is diametrically opposite thereto has the lowest rate of flow. The resultant unbalance in the flow of plastic material gives rise to eccentricity in the covering extruded upon the conductor.

Various methods and apparatus have been devised in an attempt to obtain balanced flow conditions in extruders to insure concentricity of the extruded covering on a finished insulated conductor. Such methods and apparatus have had varying degrees of success and often have required relatively expensive changes in the design of conventional extruding apparatus.

It is an object of this invention to provide new and improved methods of and apparatus for extruding plastic material.

Another object of this invention is to provide new and improved methods of and apparatus for extruding organic plastic insulating and jacketing material upon continuously advancing filamentary conductors.

A method of extruding plastic material illustrating certain features of the invention may include the steps of forcing such a material into a extrusion passage having positioned at one end thereof an extrusion die provided with a forming throat, dividing the plastic material into two streams, and injecting the streams at diameterically opposite points into a chamber having a relatively large volume. The streams are recombined within the chamber so that the pressure throughout a cross section of the resulting mass of plastic is substantially uniform and the combined material is then caused to flow through the throat of the die.

Apparatus illustrating certain features of the invention may include an extrusion cylinder having an extrusion bore formed therein, an extrusion head mounted at the discharge end of the extrusion cylinder and provided with a passage communicating with the extrusion bore and extending transversely with respect thereto, means for forcing a plastic material along the extrusion bore and into the passage and an extrusion die positioned in one end of the passage and having a forming throat. Means are provided for dividing the plastic material into two streams and for injecting the streams into a free chamber having a relatively large volume adjoining the throat of the die so that the streams recombine within the chamber and the flow conditions throughout a cross section of the resulting mass of plastic material entering the throat of the die are substantially uniform.

A complete understanding of the invention may be obtained from the following detailed description of methods and apparatus forming specific embodiments thereof, when read in conjunction wtih the appended drawings, in which.

Figure 1:
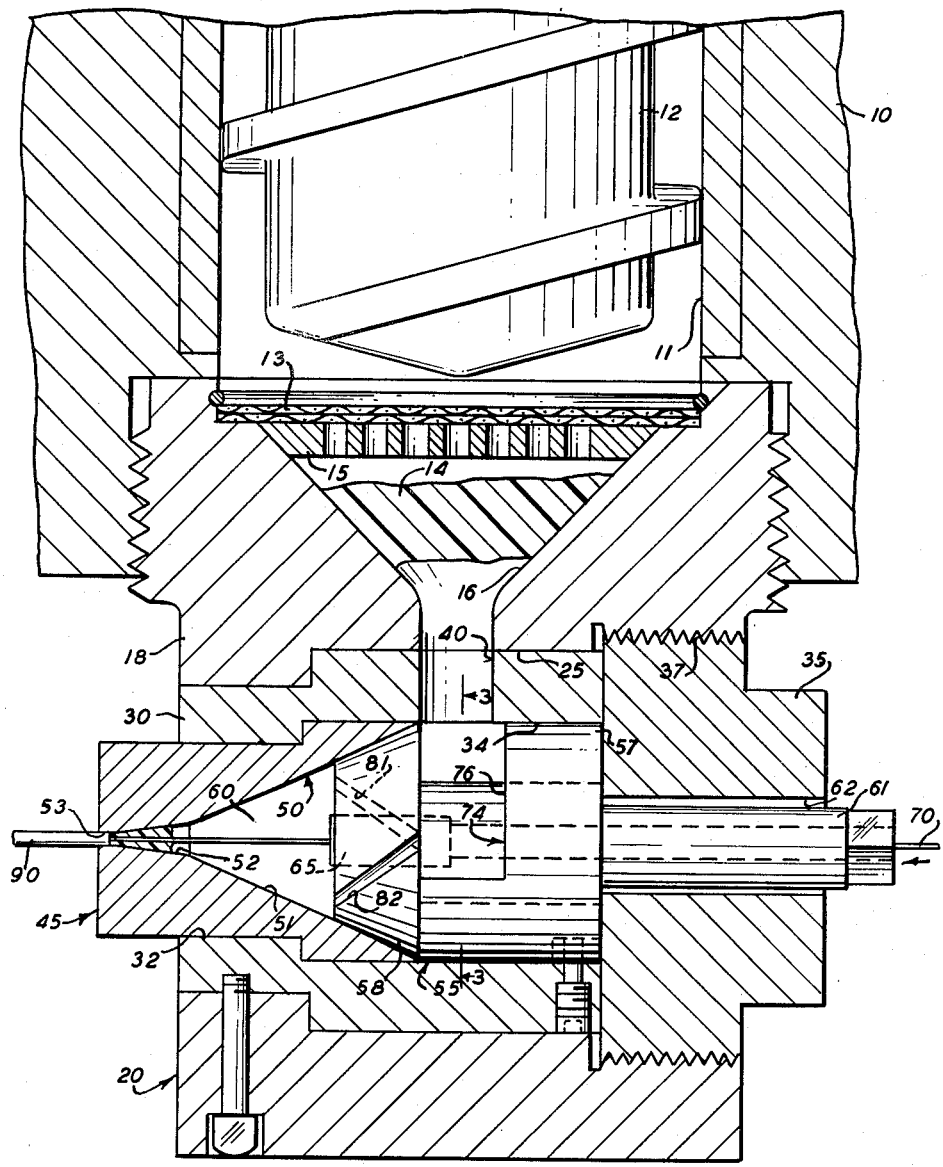
Fig. 1 is a fragmentary, horizontal section of an extruding apparatus illustrating certain features of the invention.

Referring now in detail to the drawings, there is shown in Fig. 1 an extrusion cylinder 10 having formed therein an elongated, cylindrical extrusion bore 11 in which a stock screw 12 is mounted rotatably. The stock screw 12 is designed to be rotated by suitable drive means (not shown) for the purpose of working and forcing a plastic insulating material 14 along the extrusion bore 11, through a strainer 13 and a perforated backing plate 15, and into and through a tapered opening 16 in a body member 18 forming part of an extrusion head 20. The extrusion head designated generally by the numeral 20 is mounted detachably to the discharge end of the extrusion cylinder 10 so that the tapered opening 16 therein forms a continuation of the extrusion bore 11.

3

The tapered opening 16 communicates with a generally cylindrical bore 25 formed in the body member 18, in which a tool holder 30 is mounted removably. The tool holder is provided with a cylindrical bore 32 and an enlarged cylindrical counterbore 34 formed coaxially therein. A threaded retainer nut 35 is engaged threadedly within a complementary, threaded counterbore 37 and serves to hold the tool holder in place within the bore 25. The tool holder is provided additionally with a feed port 40 extending radially from the outer periphery thereof to the counterbore 34. The feed port 40 is aligned with the discharge end of the tapered opening 16 so as to form a continuation thereof.

An extrusion die designated generally by the numeral 45 fits closely within the lefthand end of the bore 32 and counterbore 34, as viewed in Fig. 1, and is oriented so that the longitudinal axis of a die orifice designated generally by the numeral 50 formed therein is aligned precisely on the common longitudinal axis of the bore 32 and counterbore 34 formed in the tool holder 30. The die orifice 50 is provided at its entrance end with an enlarged, frustoconical chamber portion 51 converging at a relatively large included angle, for example about 45°. Adjoining the chamber portion 51 of the die orifice 50 is a frustoconical throat portion 52 which is relatively short compared to the entrance portion. For example, the length of the chamber portion 51 measured along the longitudinal axis thereof may be about three times that of the throat portion 52. The throat portion 52 converges at a relatively smaller included angle, for example about 15°, and at its minimum diameter joins a very short cylindrical land portion 53.

A core tube holder designated generally by the numeral 55 has a generally cylindrical body 57 and a frustoconical head 58. The body 57 of the core tube holder 55 fits closely within the counterbore 34, while the head 58 converges at the same angle as the chamber portion 51 of the die orifice 50 and is received closely therewithin. As shown in Fig. 1, the head 58 extends about one-third of the length of the chamber portion 51, leaving a relatively large free chamber 60. In addition to securing the tool holder 30 in place, the retainer nut 35 also serves to retain the core tube holder 55 in place within the tool holder. A reduced shank 61 of the core tube holder 55 extends outwardly through a bore 62 formed in the retainer nut 35.

Figure 3:
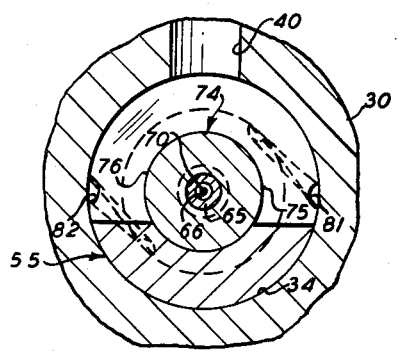
Fig. 3 is a fragmentary, vertical section taken along line 3—3 of Fig. 1.

A core tube 65 is mounted concentrically within the core tube holder 55 and is provided with a longitudinally extending axial passage 66 (Fig. 3) which is aligned precisely on the common longitudinal axis of the die orifice 50 and the counterbore 34. The core tube 65 is designed to guide a filamentary conductor 70 which is continuously advanced longitudinally by suitable conductor-advancing means (not shown) through the passage 66 and thence into and through the die orifice 50. The core tube 65 guides the advancing filamentary conductor towards the axial center of the die orifice 50.

Figure 2:
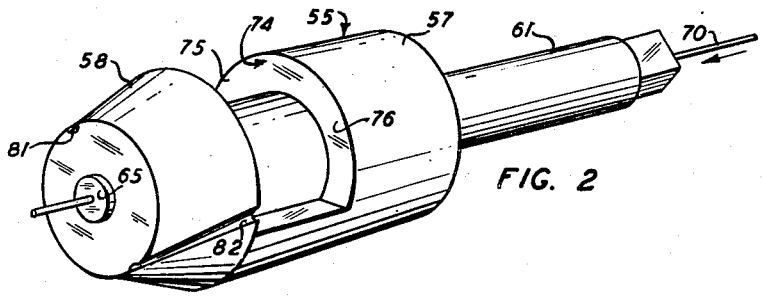
Fig. 2 is a perspective view of a core tube and core tube holder forming part of the apparatus shown in Fig. 1.

The body 57 of the core tube holder 55 is provided with a relieved channel 74 having two substantially identical, arcuate-shaped channel legs 75 and 76 (Figs. 2 and 3) formed symmetrically in its periphery. The channel legs 75 and 76 extend circumferentially from a confluency at the discharge end of the feed port 40 to locations on opposite sides of the body 57 equidistant from the feed port. The distal ends of the channel legs 75 and 76 communicate with substantially identical, restricted grooves 81 and 82, respectively, formed in the periphery of the head 58. The entrance ends of the restricted grooves 81 and 82, at which they communicate with their respective channel legs 75 and 76, lie in a vertical plane including the longitudinal axis of the die orifice 50 and counterbore 34 and are equidistant from the longitudinal axis of the stock screw 12.

The restricted grooves 81 and 82 are oriented angularly so that their projections on a horizontal plane including

4 the longitudinal axis of the die orifice 50 form equal and opposite angles with respect to this axis. The restricted grooves 81 and 82 are uniform in width and depth along their entire lengths. At their discharge ends the restricted grooves 81 and 82 communicate with free chamber 60.

*Operation*

During the operation of the extruding apparatus described hereinabove, the filamentary conductor 70 is advanced longitudinally at a predetermined speed in the direction of the arrow shown in Fig. 1. At the same time a suitable plastic insulating material 14, such as polyethylene or the like, is advanced by the rotating stock screw 12 in an extrudable condition through the extrusion bore 11 and into the tapered opening 16 in the extrusion head 20. The plastic material 14 then enters the feed port 40 in the tool holder 30 and thereafter is split into two separate, equal streams which flow through the symmetrical channel legs 75 and 76, respectively, formed in the periphery of the core tube holder 55.

The two separate streams of plastic material 14 flow circumferentially around the core tube holder 55 in opposite directions to diametrically opposite points on the core tube holder, and enter the restricted grooves 81 and 82, respectively. The streams of plastic material 14 emerge from the restricted grooves 81 and 82 at a relatively high velocity and enter the free chamber 60, which has a relatively large volume. The streams of plastic material 14 enter the free chamber 60 at diametrically opposite points and are substantially identical in all respects. Due to the angular orientation of the restricted grooves 81 and 82, these streams possess substantial tangential velocity components in addition to their forward components of velocity.

As a result of the tangential velocity components, the streams of plastic material 14, as they recombine within the chamber 60, are directed so as to form a cyclonic spiral of decreasing diameter, and the relatively high velocity pressure of the streams is converted into a relatively high static pressure. The cyclonic spiral imparted to the flow of plastic material 14 through the chamber 60 exerts a natural centering influence on the conductor 70 which advances through its vortex. The resultant forces are such that the conductor 70 will remain undisturbed as long as it travels along a centered path through the die orifice 50, and, therefore, the conductor tends to remain centered within the die orifice. The distribution of plastic material 14 flowing through any given cross section of the throat portion 51 perpendicular to the longitudinal axis thereof is substantially balanced, whereby a substantially concentric covering 90 of the plastic material 14 is formed upon the continuously advancing conductor 70.

*Alternative embodiment*

Figure 4:
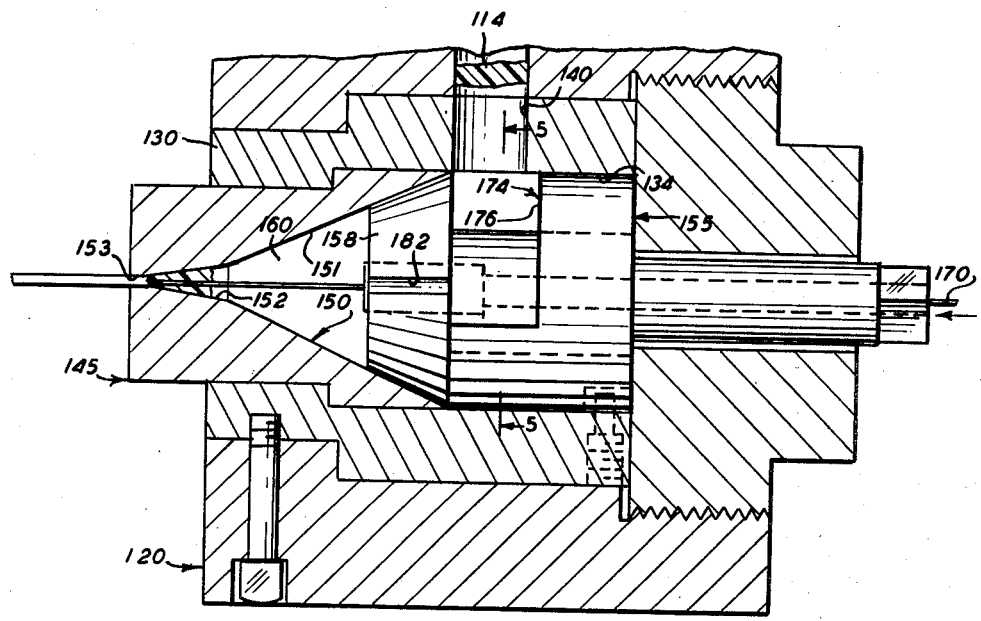
Fig. 4 is a fragmentary, horizontal section of an extruding apparatus forming an alternative embodiment of the invention.
Figure 5:
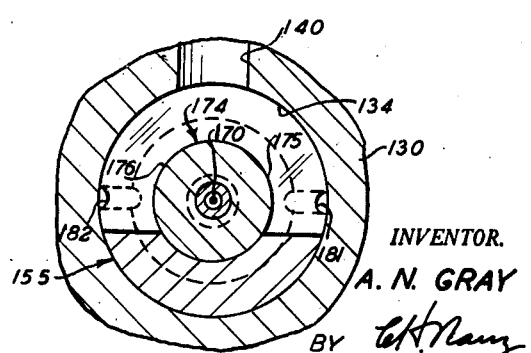
Fig. 5 is a fragmentary, vertical section taken along line 5—5 of Fig. 4.

Figs. 4 and 5 show an apparatus forming an alternative embodiment of the invention, which is substantially identical in construction to the first-mentioned embodiment, except for the orientation of restricted grooves formed on the frustoconical head of the core tube holder. The alternative embodiment includes an extrusion head designated generally by the numeral 120 having a tool holder 130 mounted therein. Within the lefthand end of a counterbore 134 formed in the tool holder 130 is an extrusion die designated generally by the numeral 145 which is provided with a die orifice designated generally by the numeral 150 having an enlarged chamber portion 151, a throat portion 152, and a land portion 153.

A core tube holder designated generally by the numeral 155 is received within the tool holder 130 and is provided with a relieved channel 174 having two arcuate-shaped channel legs 175 and 176 (Fig. 5) which extend circumferentially from a confluency at the discharge end of a feed port 140 to locations on opposite sides of the core tube holder equidistant from the feed port. The core tube holder 155 is provided with a frustoconical head 158 in which two substantially identical radially extending restricted grooves 181 and 182 (Fig. 5) are formed. The grooves 181 and 182 lie in a plane including the longitudinal axis of the die orifice 150 which plane is transverse to the longitudinal axis of the extrusion bore. Their projections on a horizontal plane including the longitudinal axis of the die orifice 150 coincide. Thus, in contrast to the restricted grooves 81 and 82 of the first-mentioned embodiment, the restricted grooves 181 and 182 are not oriented angularly. Otherwise, the depth and width of the restricted grooves 181 and 182 are identical to those of the restricted grooves 81 and 82. Similarly, the entrance ends at which restricted grooves 181 and 182 communicate with the channel legs 175 and 176, respectively, are equidistant from the feed port 140.

*Operation of the alternative embodiment*

A filamentary conductor 170 is advanced longitudinally at a predetermined speed in the direction of the arrow shown in Fig. 4. At the same time a suitable plastic insulating material 114 in an extrudable condition is forced into the extrusion head 120 and into the feed port 140. Upon emerging from the feed port 140 the plastic material 114 splits into two separate, equal streams which flow through the channel legs 175 and 176, respectively.

The separate streams of plastic material 114 enter and flow through the restricted grooves 181 and 182 at a relatively high velocity and emerge therefrom to recombine within a free chamber 160 of a relatively large volume, which is formed by the chamber portion 151 of the die orifice 150. The two streams of plastic material 114 enter the chamber 160 at diametrically opposite points and are substantially identical in all respects, such as pressure and velocity. The relatively high velocity of these streams, as they enter the free chamber 160, is absorbed and converted into a relatively high static pressure in that chamber. The free chamber 160, because of its relatively large cross sectional area, tends to damp out turbulence due to the relatively high velocity of the two entering streams of plastic material 114. As a result, the flow of plastic material through the throat portion 152 of the die orifice 150 tends to be substantially balanced throughout any cross section thereof perpendicular to the longitudinal axis of this orifice. Consequently, a substantially concentric covering of the plastic material is applied upon the continuously advancing conductor 170.

It will be understood that the term "plastic insulating material" as employed in the specification and appended claims is meant to include thermoplastic material such as polyethylene, polyvinyl compounds, or the like, and also thermosetting materials, such as rubber or rubber-like compounds, Neoprene compounds, or the like.

Manifestly, various other embodiments of the invention may be made within the spirit and scope of the invention.

What is claimed is:

1. The method of extruding plastic material, which comprises forcing such a material toward an extrusion passage having an extrusion die positioned at one end thereof, dividing the plastic material into a plurality of substantially equal streams having relatively high velocities and injecting the streams into a substantially conically shaped chamber having a relatively large volume and adjoining a constricted throat of the extrusion die, the streams being injected into the chamber so that each stream has a forward component of velocity and a radially inward component of velocity, the resultant of said components being parallel to the slant height of the surface of the chamber, and each stream has also a tangential component of velocity so that the streams have a combined effect of causing a cyclonic spiral flow of the plastic material throughout the chamber, the spiral flow decreasing in diameter as it advances toward the extrusion die so that the apex of the spiral is located substantially on the longitudinal axis of the die orifice and adjacent to the constricted throat thereof, whereby the plastic material flows through the constricted throat as a balanced unitary stream.

2. The method of extruding plastic material, which comprises forcing such a material toward an extrusion passage having an extrusion die positioned at one end thereof, dividing the platsic material into two substantially equal streams having relatively high velocities, and injecting the streams at diametrically opposite points in a substantially conically shaped chamber having a relatively large volume and adjoining a constricted throat of the extrusion die, the streams being injected into the chamber so that each stream has a forward component of velocity and a radially inward component of velocity, the resultant of said components being parallel to the slant height of the surface of the chamber, and each stream has also a tangential component of velocity so that the streams have a combined effect of causing a cyclonic spiral flow of the plastic material throughout the chamber, the spiral flow decreasing in diameter as it advances toward the extrusion die so that the apex of the spiral is located substantially on the longitudinal axis of the die orifice and adjacent to the constricted throat thereof, whereby the plastic material flows through the constricted throat as a balanced unitary stream.

3. The method of extruding a concentric tubular covering of plastic material on a filamentary core advancing through an extrusion die mounted at one end of a passage communicating with and extending transversely with respect to the discharge end of an extrusion cylinder, which comprises forcing such a material toward the passage having the extrusion die positioned at one end thereof, dividing the plastic material into two substantially equal streams having relatively high velocities, injecting the streams at diametrically opposite points in a substantially conically shaped chamber having a relatively large volume and adjoining a constricted throat of the extrusion die, the streams being injected into the chamber equidistantly from the discharge end of the extrusion cylinder so that each stream has a forward component of velocity and a radially inward component of velocity, the resultant of said components being parallel to the slant height of the surface of the chamber and each stream having also a tangential component of velocity so that the streams have a combined effect of causing a cyclonic spiral flow of the plastic material throughout the chamber, the relatively high velocity of said streams being converted into relatively high static pressure within the chamber, the spiral flow decreasing in diameter as it advances toward the extrusion die so that the apex of the spiral is located substantially on the longitudinal axis of the die orifice and adjacent to the constricted throat thereof, and directing the filamentary core through the extrusion passage so that it tends to pass through the apex of the spiral and the center of the constricted throat of the extrusion die whereby the plastic material flows through the constricted throat as a balanced unitary stream and a substantially concentric tubular covering of plastic material is extruded upon the core.

4. In apparatus for extruding plastic material including an extrusion cylinder having an extrusion bore formed therein, an extrusion head mounted at the discharge end of the extrusion cylinder and provided with a passage communicating with the extrusion bore and extending transversely with respect thereto, means for forcing the plastic material along the extrusion bore and into the passage, and an extrusion die having a forming throat therein positioned in one end of the passage, the improvement which comprises means for dividing the plastic material into two streams, a substantially conically shaped means defining in the extrusion passage a chamber having a relatively large volume and adjoining the forming throat of the extrusion die, the apex of the conically shaped chamber being adjacent to the forming throat of the extrusion die, and means for increasing the velocity of the streams and for injecting the streams into the chamber so that each stream has a forward component of velocity and a radially inward component of velocity, the resultant of said components being parallel to the slant height of the surface of the chamber and each stream having also a tangential component of velocity, said chamber being utilized for combining the streams to cause a cyclonic spiral flow of plastic material throughout the chamber, the spiral flow decreases in diameter as it moves toward the extrusion die so that the apex of the spiral is located substantially on the longitudinal axis of the forming throat and adjacent to the forming throat whereby the plastic material flows through the forming throat as a balanced unitary stream.

5. In apparatus for extruding plastic material including an extrusion cylinder having an extrusion bore formed therein, an extrusion head mounted at the discharge end of the extrusion cylinder and provided with a passage communicating with the extrusion bore and extending transversely with respect thereto, and means for forcing a plastic material along the extrusion bore and into the passage, the improvement which comprises an extrusion die mounted at one end of the passage and provided with an axial die orifice having an enlarged frustoconically shaped entrance portion and an adjoining restricted throat portion, and a frustoconically shaped plug-like member mounted within the passage of the head and blocking an entrance of the enlarged portion of the die orifice except for a pair of diametrically opposed restricted grooves formed in the periphery of the plug-like member for dividing the plastic material entering the passage into two substantially identical streams of greatly increased velocity, said restricted grooves being directed forwardly, radially inwardly and tangentially with respect to the frustoconically shaped portion and at an acute angle with respect to the longitudinal axis of the passage and the die orifice for injecting said streams into the enlarged frustoconically shaped entrance portion of the die orifice wherein the relatively high velocity thereof is converted into a relatively high static pressure, the streams being injected into the enlarged frustoconically shaped portion having a forward component of velocity and a radially inward component of velocity, the resultant of said component being parallel to the slant height of the surface of the enlarged portion and each stream having also a tangential component of velocity so that the streams have a combined effect causing a cyclonic spiral flow of the plastic material which continues throughout the enlarged portion whereby the plastic material flows through the throat portion of the die orifice as a balanced unitary stream.

References Cited in the file of this patent

UNITED STATES PATENTS

| | | |
|---|---|---|
| 2,341,731 | MacGregor et al. | Feb. 15, 1944 |
| 2,560,778 | Richardson et al. | July 17, 1951 |
| 2,740,988 | Henning | Apr. 10, 1956 |
| 2,766,480 | Henning | Oct. 16, 1956 |
| 2,788,059 | Henning et al. | Jan. 22, 1957 |
| 2,794,213 | Davis | June 4, 1957 |

FOREIGN PATENTS

| | | |
|---|---|---|
| 883,883 | France | Apr. 5, 1943 |
| 938,214 | France | Mar. 30, 1948 |
| 624,699 | Great Britain | June 15, 1949 |
| 458,747 | Italy | 1950 |
| 235,616 | Switzerland | Apr. 16, 1945 |